(12) United States Patent
Kim et al.

(10) Patent No.: US 11,726,393 B2
(45) Date of Patent: Aug. 15, 2023

(54) REFLECTION MODULE AND CAMERA MODULE INCLUDING REFLECTION MODULE

(71) Applicant: SAMSUNG ELECTRO-MECHANICS CO., LTD., Suwon-si (KR)

(72) Inventors: Jae Kyung Kim, Suwon-si (KR); Byung Gi An, Suwon-si (KR); Jung Seok Lee, Suwon-si (KR); Hwan Jun Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 243 days.

(21) Appl. No.: 17/171,071

(22) Filed: Feb. 9, 2021

(65) Prior Publication Data

US 2021/0294184 A1    Sep. 23, 2021

(30) Foreign Application Priority Data

Mar. 18, 2020 (KR) .......... 10-2020-0033406
Sep. 3, 2020 (KR) .......... 10-2020-0112639

(51) Int. Cl.
*G03B 17/17* (2021.01)
*G02B 7/182* (2021.01)

(52) U.S. Cl.
CPC ........... *G03B 17/17* (2013.01); *G02B 7/1821* (2013.01)

(58) Field of Classification Search
CPC ............................. G03B 17/17; G02B 7/1821
USPC ....................................................... 359/726
See application file for complete search history.

(56) References Cited

U.S. PATENT DOCUMENTS

| 10,816,756 B2 | 10/2020 | Lee et al. |
| 2013/0163085 A1 | 6/2013 | Lim et al. |
| 2017/0293105 A1 | 10/2017 | Hu et al. |
| 2018/0109660 A1 | 4/2018 | Yoon et al. |

(Continued)

FOREIGN PATENT DOCUMENTS

| CN | 107942605 A | 4/2018 |
| JP | 2017-198979 A | 11/2017 |

(Continued)

OTHER PUBLICATIONS

Korean Notice of Reason for Rejection dated Oct. 14, 2021 in corresponding Korean Patent Application No. 10-2020-0112639. (10 pages in English and 7 pages in Korean).

(Continued)

*Primary Examiner* — William Choi
(74) *Attorney, Agent, or Firm* — NSIP Law

(57) ABSTRACT

A camera module includes: a lens module including a plurality of lenses disposed along an optical axis; a housing accommodating the lens module; and a reflection module disposed in front of the lens module, and including a reflective member configured to change an optical path, and a holder in which the reflective member is mounted. The reflection module is rotatably disposed on a first axis and a second axis perpendicular to the optical axis. A first position sensor configured to sense a position change of the reflection module with respect to the first axis is disposed in the housing. A second position sensor configured to sense a position change of the reflection module with respect to the second axis is disposed in the housing. A sensitivity of the first position sensor is different from a sensitivity of the second position sensor.

20 Claims, 18 Drawing Sheets

(56) References Cited

U.S. PATENT DOCUMENTS

| | | |
|---|---|---|
| 2018/0364450 A1 | 12/2018 | Lee et al. |
| 2019/0235202 A1 | 8/2019 | Smyth et al. |
| 2020/0241238 A1 | 7/2020 | Park |

FOREIGN PATENT DOCUMENTS

| | | |
|---|---|---|
| KR | 10-2013-0072721 A | 7/2013 |
| KR | 10-2018-0137278 A | 12/2018 |
| KR | 10-2019-0037863 A | 4/2019 |
| KR | 10-2020-0013019 A | 2/2020 |

OTHER PUBLICATIONS

Chinese Office Action dated Dec. 20, 2022, in counterpart Chinese Patent Application No. 202110279289.5 (8 pages in English, 10 pages in Chinese).

REFLECTION MODULE AND CAMERA MODULE INCLUDING REFLECTION MODULE

CROSS-REFERENCE TO RELATED APPLICATION(S)

This application claims the benefit under 35 U.S.C. § 119(a) of Korean Patent Application No. 10-2020-0033406 filed on Mar. 18, 2020 and Korean Patent Application No. 10-2020-0112639 filed on Sep. 3, 2020 in the Korean Intellectual Property Office, the entire disclosures of which are incorporated herein by reference for all purposes.

BACKGROUND

1. Field

The following description relates to a reflection module and a camera module including a reflection module.

2. Description of Related Art

Camera modules are currently implemented in portable electronic devices, such as smartphones. Thicknesses of portable electronic devices are being decreased due to market demand, and accordingly, the miniaturization of camera modules is desired.

In addition to demand for the miniaturization of camera modules, performance improvements of camera modules are also required. Accordingly, functions such as automatic focus adjustment, optical image stabilizing, and the like, are added to camera modules, so there is a limitation in reducing the size of such camera modules.

That is, a camera module may have a problem in that it may be difficult to reduce the size of the camera module despite demand for miniaturization and, accordingly, there may be a limitation in reducing the thickness of a portable electronic device including the camera module.

Recently, in order to solve such a problem, a camera module including a plurality of lenses disposed in a length or width direction of a portable electronic device and a reflective member configured to change a path of light has been proposed. Such a camera module has a structure for correcting shake by rotating the reflective member, and light may be reflected at an angle greater than a reflection angle of light required for correcting shake according to a rotation direction of the reflective member. In this case, since optical image stabilizing performance may be deteriorated, it may be necessary to more accurately detect a position of the reflective member.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a lens module including a plurality of lenses disposed along an optical axis; a housing accommodating the lens module; and a reflection module disposed in front of the lens module, and including a reflective member configured to change an optical path, and a holder in which the reflective member is mounted. The reflection module is rotatably disposed on a first axis and a second axis perpendicular to the optical axis. A first position sensor configured to sense a position change of the reflection module with respect to the first axis is disposed in the housing. A second position sensor configured to sense a position change of the reflection module with respect to the second axis is disposed in the housing. A sensitivity of the first position sensor is different from a sensitivity of the second position sensor.

The first axis may be formed in a thickness direction of the housing and the second axis may be formed in a width direction of the housing. The sensitivity of the second position sensor may be higher than the sensitivity of the first position sensor.

The sensitivity of the first position sensor may be less than 1.0 mV/mT, and the sensitivity of the second position sensor may be 1.0 mV/mT or higher.

The sensitivity of the first position sensor may be less than 1.0 mV/mT, and the sensitivity of the second position sensor may be 2.0 mV/mT or higher.

The first axis may be formed in a thickness direction of the housing and the second axis may be formed in a width direction of the housing. The first position sensor may be a Hall sensor and the second position sensor may be a tunnel magnetoresistance (TMR) sensor.

The camera may further include: a first driving portion configured to rotate the reflection module about the first axis; and a second driving portion configured to rotate the reflection module about the second axis. The first driving portion may include a first magnet disposed on the reflection module and a first coil opposing the first magnet. The second driving portion may include a second magnet disposed on the reflection module and a second coil opposing the second magnet.

The first magnet may have a shape having a length in a direction of the first axis. A surface of the first magnet opposing the first coil may have a first polarity, a neutral region, and a second polarity along the optical axis.

The first position sensor may be disposed to oppose the neutral region of the first magnet.

The second magnet may have a shape having a length in a direction of the optical axis. A surface of the second magnet opposing the second coil may have a first polarity, a neutral region, and a second polarity along the first axis.

The second position sensor may be disposed to oppose the neutral region of the second magnet.

The first magnet and the second magnet may be disposed on a side wall of the holder. The second magnet may be disposed closer to the lens module, as compared to the first magnet.

The first driving portion may be configured to generate driving force in a direction of the optical axis. The second driving portion may be configured to generate driving force in a direction of the first axis.

The camera module may further include: a guide member disposed between the housing and the reflection module; a first ball member disposed between the reflection module and the guide member and including a plurality of ball members disposed along the first axis; and a second ball member disposed between the housing and the guide member and including a plurality of ball members disposed along the second axis. Side walls of the holder may protrude along the optical axis to cover the guide member.

In another general aspect, a reflection module includes: a reflective member configured to change an optical path; a holder in which the reflective member is mounted; a housing accommodating the holder; a first driving portion including a first magnet disposed on the holder and a first coil opposing the first magnet; and a second driving portion including a second magnet disposed on the holder and a second coil opposing the second magnet. The holder is rotatable around a first axis by the first driving portion, and is rotatable around a second axis perpendicular to the first axis by the second driving portion. A first position sensor opposing the first magnet and a second position sensor opposing the second magnet are disposed in the housing. A sensitivity of the first position sensor is different from a sensitivity of the second position sensor.

The holder may be configured to pivot around the first axis, in between left and right directions, and may be configured to pivot around the second axis, in between upward and downward directions. The sensitivity of the second position sensor may be higher than the sensitivity of the first position sensor.

The first position sensor may be a Hall sensor, and the second position sensor may be a tunnel magnetoresistance (TMR) sensor.

In another general aspect, an electronic device includes a camera module. The camera module includes: a lens module including a plurality of lenses disposed along an optical axis; a housing accommodating the lens module; a reflection module configured to change an optical path of light incident to the reflection module, and being rotatably disposed on a first axis and a second axis perpendicular to the optical axis; a first position sensor disposed in the housing and configured to sense a position change of the reflection module with respect to the first axis; and a second position sensor disposed in the housing and configured to sense a position change of the reflection module with respect to the second axis. A sensitivity of the first position sensor is different from a sensitivity of the second position sensor.

The light may be incident to the reflection module in a direction of the first axis, and the direction of the first axis may correspond to a thickness direction of the housing.

A direction of the second axis may correspond to a width direction of the housing. The sensitivity of the second position sensor may be higher than the sensitivity of the first position sensor.

A type of the first position sensor may be different than a type of the second position sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
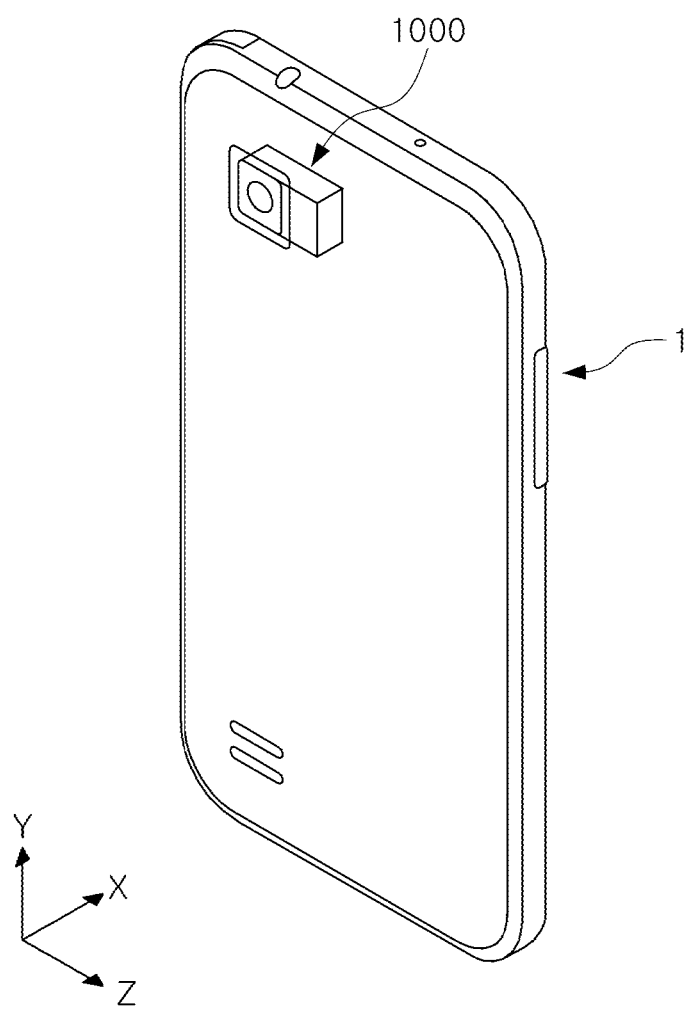
FIG. 1 is a perspective view of a portable electronic device equipped with a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

FIG. 1 is a perspective view of a portable electronic device 1 equipped with a camera module 1000, according to an embodiment.

Referring to FIG. 1, the camera module 1000 may be mounted on the portable electronic device 1 to capture an image of a subject, for example. The portable electronic device 1 may be a portable electronic device such as a mobile communication terminal, a smart phone, a tablet PC, or the like.

The camera module 1000 may include a plurality of lenses. An optical axis (a Z-axis) of the plurality of lenses may be perpendicular to a thickness direction of the portable electronic device 1 (an X-axis direction, a direction from a front surface to a rear surface of the portable electronic device, or a direction opposite thereto).

For example, the optical axis (the Z-axis) of the plurality of lenses provided in the camera module 1000 may be formed in a width direction or a length direction of the portable electronic device 1.

Therefore, even when functions such as autofocusing (hereinafter, referred to as AF), optical zoom (hereinafter, referred to as Zoom), and optical image stabilizing (hereinafter, referred to as OIS), or the like are provided in the portable electronic device 1, it is possible to prevent a thickness of the portable electronic device 1 from increasing. Therefore, the portable electronic device 1 may be thinned.

The camera module 1000 may have any one or any combination of any two or more of AF, zoom, and OIS functions.

Since a camera module including AF, Zoom, OIS functions, and the like, needs to be provided with various components, a size of the camera module may increase, as compared to a general camera module. When the size of a camera module increases, it may be difficult to reduce the thickness of a portable electronic device in which the camera module is mounted.

For example, the camera module may include a plurality of lens groups for the zoom function. When the plurality of lens groups are disposed in the thickness direction of the portable electronic device, the thickness of the portable electronic device may also increase according to the number of lens groups. Therefore, when the thickness of the portable electronic device is not increased, the number of lens groups may not be sufficiently secured, and thus zoom performance may be weakened.

In addition, to implement the AF, zoom, OIS functions, and the like in the camera module, an actuator configured to move the plurality of lens groups in an optical axis direction (a Z-axis direction), or a direction perpendicular to the optical axis direction, may be installed. When the optical axis (the Z-axis) of the lens group is formed in the thickness direction of the portable electronic device, an actuator for moving the lens group may also be installed in the thickness direction of the portable electronic device. Therefore, the thickness of the portable electronic device may increase.

In the camera module 1000, since the optical axes (the Z-axis) of the plurality of lenses may be arranged to be perpendicular to the thickness direction (the X-axis direction) of the portable electronic device 1, even when the camera module 1000 having the AF, zoom, and OIS functions is mounted, the portable electronic device 1 may be thinned.

Figure 2:
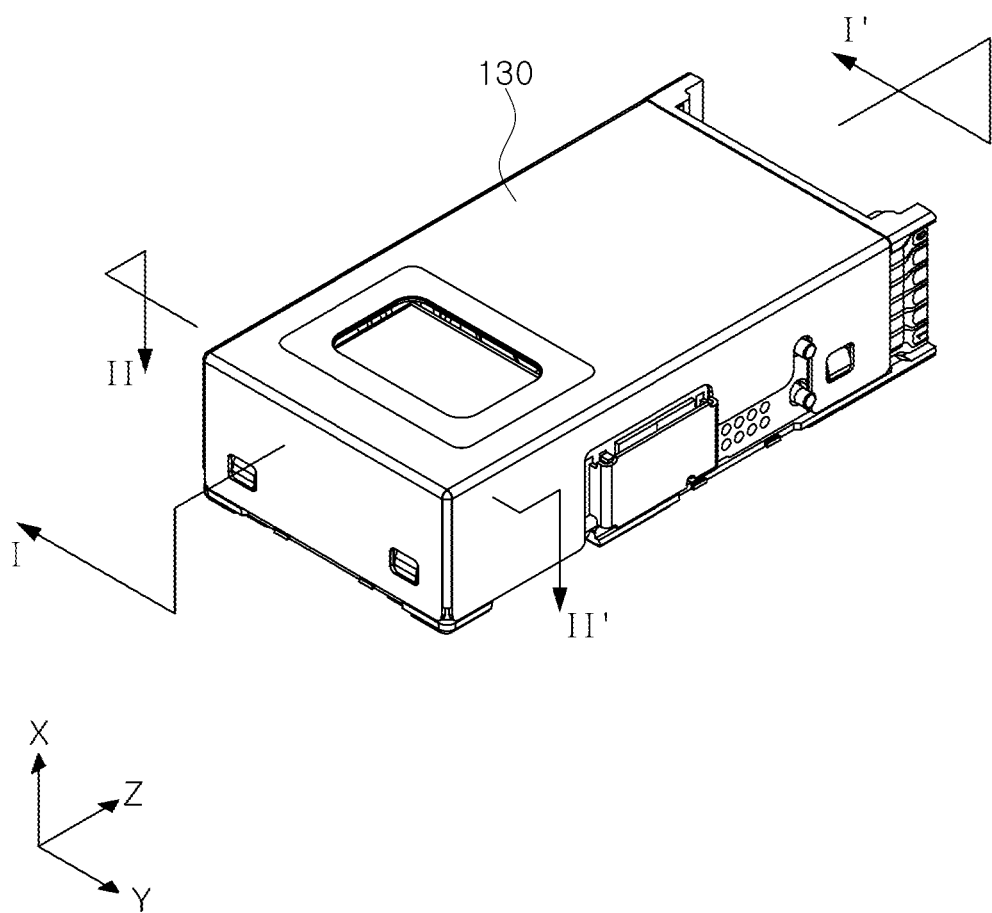
FIG. 2 is a schematic perspective view of the camera module, according to an embodiment.
Figure 3A:
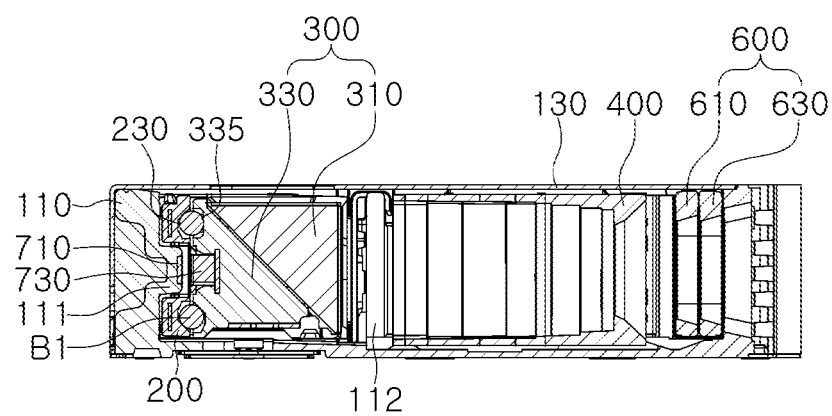
FIG. 3A is a cross-sectional view of FIG. 2 taken along line I-I'.
Figure 3B:
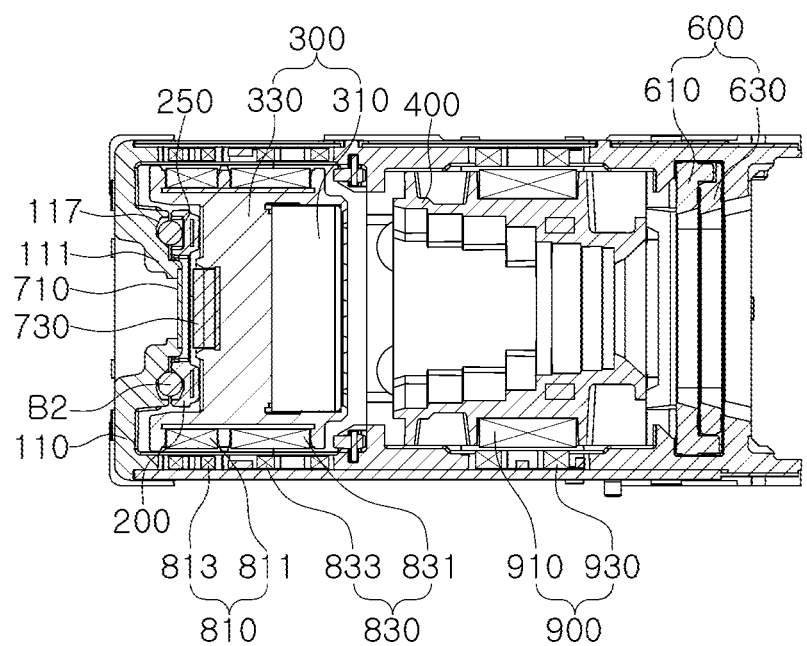
FIG. 3B is a cross-sectional view of FIG. 2 taken along line II-II'.

FIG. 2 is a schematic perspective view of the camera module 1000, according to an embodiment. FIG. 3A is a cross-sectional view of FIG. 2 taken along line I-I'. FIG. 3B is a cross-sectional view of FIG. 2 taken along line II-II'.

Figure 4:
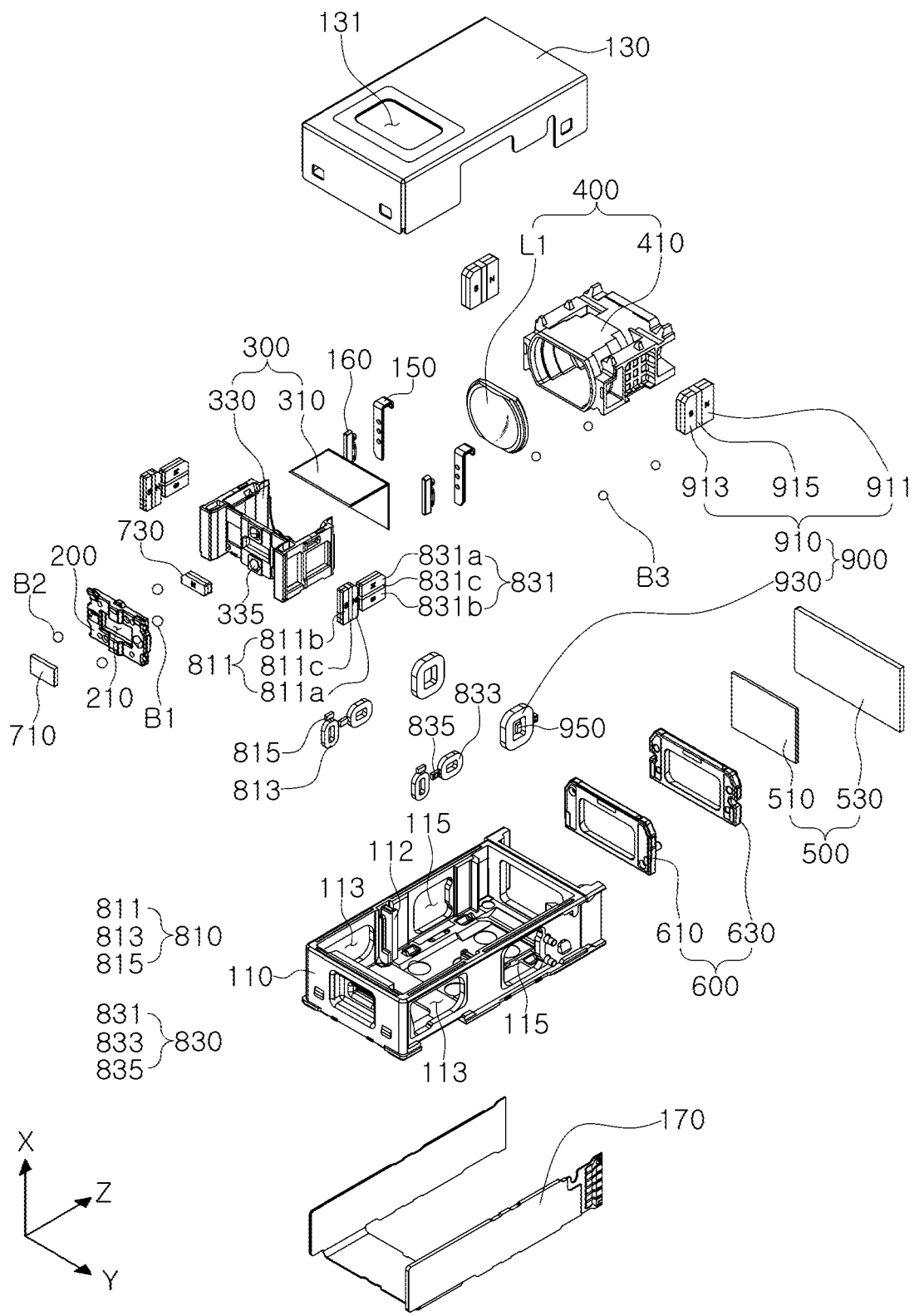
FIG. 4 is a schematic exploded perspective view of the camera module, according to an embodiment.
Figure 5:
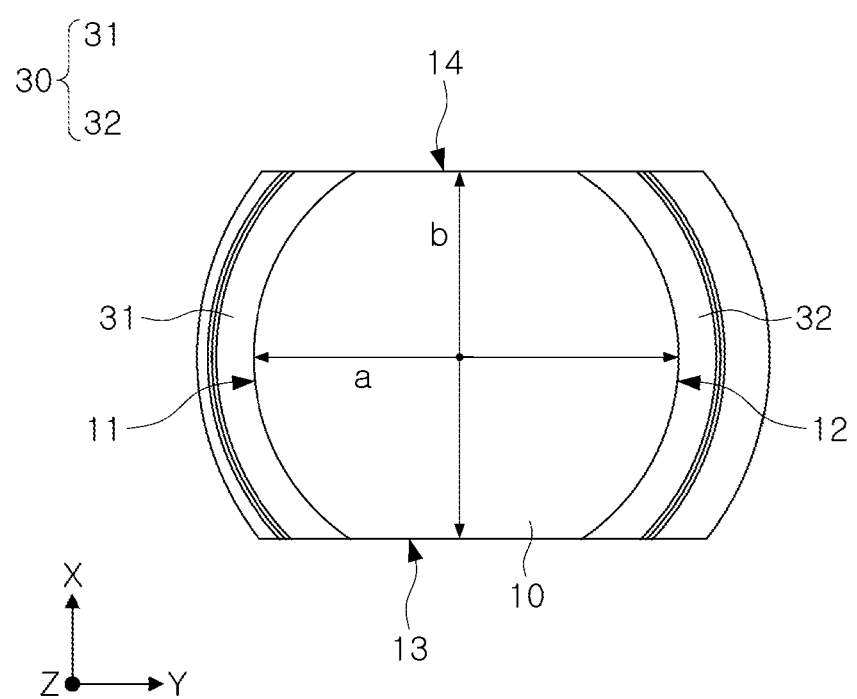
FIG. 5 is a plan view of a lens provided in the camera module, according to an embodiment.

FIG. 4 is a schematic exploded perspective view of the camera module 1000, according to an embodiment. FIG. 5 is a plan view of a lens provided in a camera module, according to an embodiment.

Referring to FIGS. 2 to 4, the camera module 1000 may include, for example, a housing 110, a reflection module 300, a lens module 400, an image sensor module 500, and a case 130.

The reflection module 300, the lens module 400, and the image sensor module 500 may be arranged in an internal space formed by the housing 110 from one side of the housing 110 toward the other side of the housing 110. The housing 110 may provide the internal space to accommodate the reflection module 300, the lens module 400, and the image sensor module 500. In an example, the image sensor module 500 may be disposed outside the housing 110.

FIGS. 2 to 4 illustrate embodiments in which the reflection module 300, the lens module 400, and the image sensor module 500 may be arranged in the internal space formed by the housing 110. Alternatively, unlike the embodiments of FIGS. 2 to 4, the reflection module 300 may be disposed outside the housing 110, and in this case, the one side of the housing 110 may open to pass light transmitted from the reflection module 300. In addition, the reflection module 300, when disposed outside the housing 110, may be accommodated in a separate housing.

The housing 110 may have a box shape that is open in an upward direction.

The case 130 may be coupled to the housing 110 to cover an upper portion of the housing 110. The case 130 may have an opening 131 such that light is incident through the opening. A travelling direction of light incident through the opening 131 of the case 130 may be changed by the reflection module 300, and may be incident onto the lens module 400.

The reflection module 300 may be configured to change the traveling direction of light. As an example, the traveling direction of light incident into the internal space formed by the housing 110 may be changed to face the lens module 400 by the reflection module 300.

The reflection module 300 may include a reflective member 310 and a holder 330 on which the reflective member 310 is mounted.

The reflective member 310 may be configured to change the traveling direction of light. For example, the reflective member 310 may be a mirror or a prism that reflects light.

A path of light incident through the opening 131 of the case 130 may be changed by the reflection module 300 to face the lens module 400. For example, a path of light incident in the thickness direction (the X-axis direction) of the camera module 1000 may be changed by the reflection module 300 to substantially coincide with the optical axis direction (the Z-axis direction).

In an example in which the reflection module 300 is disposed outside the housing 110, the reflection module 300 may further include a separate housing accommodating the holder 330, and a first driving portion or driving assembly 810 and a second driving portion or driving assembly 830 that are configured to provide driving force to the reflection module 300, may be arranged in the separate housing.

The lens module 400 may include a plurality of lenses through which light of which traveling direction has been changed by the reflective member 310 passes, and a lens barrel 410 accommodating the plurality of lenses.

In FIG. 4, only a lens L1 (hereinafter, referred to as a first lens) disposed closest to an object side among the plurality of lenses is illustrated, for convenience of description.

The image sensor module 500 may include an image sensor 510 and a printed circuit board 530.

The image sensor 510 may be connected to the printed circuit board 530 by a bonding wire.

The image sensor module 500 may further include an infrared cut filter. The infrared cut filter may be attached to the housing. The infrared cut filter may serve to block light in an infrared region, among light that has passed through the lens module 400.

Based on the lens module 400, the reflection module 300 may be disposed in front of the lens module 400 (on the left with reference to FIG. 2), and the image sensor module 500 may be disposed behind the lens module 400 (on the right with reference to FIG. 2).

At least one lens among the plurality of lenses may have a non-circular planar shape. For example, the first lens L1 may be non-circular, when viewed in the optical axis direction (the Z-axis direction). In other words, the first lens L1 may be non-circular in a plane (an XY plane) perpendicular to the optical axis. All of the lenses among the plurality of lenses may also have a non-circular planar shape.

Referring to FIG. 5, in a plane (an XY plane) perpendicular to the optical axis (the Z axis), a first lens L1 may have a length in a first axis direction (the X-axis direction), perpendicular to the optical axis (the Z axis) that is shorter than a length in a second axis direction (a Y-axis direction) that is perpendicular to both of the optical axis (the Z axis) and the first axis direction (the X-axis direction).

For example, the first lens L1 may have a major axis and a minor axis. The minor axis may be a line segment connecting both side surfaces of the first lens L1 in the first axis direction (the X-axis direction) while passing through the optical axis (the Z axis), and the major axis may be a line segment connecting both side surfaces of the first lens L1 in the second axis direction (the Y-axis direction) while passing through the optical axis (the Z axis). The major axis may be perpendicular to the minor axis, and a length of the major axis may be longer than a length of the minor axis.

The first lens L1 may include an optical portion 10 and a flange portion 30.

The optical portion 10 may be a portion in which optical performance of the first lens L1 is exhibited. For example, light reflected from a subject may pass through the optical portion 10, and may be refracted.

The optical portion 10 may have refractive power, and may have an aspherical shape.

The flange portion 30 may be configured to fix the first lens L1 to another element, for example, the lens barrel 410 or other lens.

The flange portion 30 may extend from the optical portion 10, and may be integrally formed with the optical portion 10.

The optical portion 10 may be formed to have a non-circular shape. For example, the optical portion 10 may be non-circular, when viewed in the optical axis direction (the Z axis direction). Referring to FIG. 5, in a plane perpendicular to the optical axis (the Z axis), the optical portion 10 may have a length in the first axis direction (the X-axis direction), perpendicular to the optical axis (the Z axis), shorter than a length in the second axis direction (the Y-axis direction), perpendicular to both of the optical axis (the Z axis) and the first axis direction (the X-axis direction).

The optical portion 10 may include a first edge 11, a second edge 12, a third edge 13, and a fourth edge 14.

When viewed in the optical axis direction (the Z-axis direction) (e.g., in an XY plane), the first edge 11 and the second edge 12 may each have an arc shape.

The second edge 12 may be disposed on a side of the lens L1 opposite a side of the first lens L1 on which the first edge 11 is disposed. Further, the first edge 11 and the second edge 12 may be located to oppose each other with respect to the optical axis (the Z axis). That is, the first edge 11 and the second edge 12 may be spaced apart from each other at opposing positions in a Y-axis direction.

The fourth edge 14 may be disposed on a side of the first lens L1 opposite a side of the first lens L1 on which the third edge 13 is disposed. In addition, the third edge 13 and the fourth edge 14 may be located to oppose each other with respect to the optical axis (the Z axis). That is, the third edge 13 and the fourth edge 14 may be spaced apart from each other at opposing positions in an X-axis direction.

The third edge 13 and the fourth edge 14 may connect the first edge 11 and the second edge 12 to each other, respectively. The third edge 13 and the fourth edge 14 may be symmetrical with respect to the optical axis (the Z axis), and may be formed parallel to each other.

When viewed in the optical axis direction (the Z-axis direction), the first edge 11 and the second edge 12 may include an arc shape, and the third edge 13 and the fourth edge 14 may generally include a straight shape.

The optical portion 10 may have a major axis (a) and a minor axis (b). The minor axis (b) may be to a line segment connecting the third edge 13 and the fourth edge 14 in the shortest distance while passing through the optical axis (the Z axis), and the major axis (a) may be a line segment connecting the first edge 11 and the second edge 12 while passing through the optical axis (the Z axis) and perpendicular to the minor axis (b). A length of the major axis (a) may be longer than a length of the minor axis (b).

The flange portion 30 may extend along a circumference of a portion of the optical portion 10 in the second axis direction (the Y-axis direction). At least a portion of the flange portion 30 may be in contact with an internal surface of the lens barrel 410.

The flange portion 30 may include a first flange portion 31 and a second flange portion 32. The first flange portion 31 may extend from the first edge 11 of the optical portion 10, and the second flange portion 32 may extend from the second edge 12 of the optical portion 10.

The first edge 11 of the optical portion 10 may be a portion adjacent to the first flange portion 31, and the second edge 12 of the optical portion 10 may be a portion adjacent to the second flange portion 32.

The third edge 13 of the optical portion 10 may be one side surface of the optical portion 10 on which the flange portion 30 is not formed, and the fourth edge 14 of the optical portion 10 may be the other side surface of the optical portion 10 on which the flange portion 30 is not formed.

Referring to FIG. 4, in the first lens L1, one of side surfaces facing each other in the first axis direction (the X-axis direction) may be disposed to face a bottom surface of the housing 110, and side surfaces facing each other in the second axis direction (the Y-axis direction) may be disposed to face an internal side surface of the housing 110, respectively.

For example, in the first lens L1, side surfaces facing each other in the first axis direction (the X-axis direction) may be spaced apart in the thickness direction (the X-axis direction) of the housing 110, and side surfaces facing each other in the second axis direction (the Y-axis direction) may be spaced apart in the width direction (the Y-axis direction) of the housing 110.

The first axis direction (the X-axis direction) may be an axis formed in the thickness direction (the X-axis direction) of the housing 110, and the second axis direction (the Y-axis direction) may be an axis formed in the width direction (the Y-axis direction) of the housing 110.

Since a length of the first lens L1 in the first axis direction (the X-axis direction) is shorter than a length of the first lens L1 in the second axis direction (the Y-axis direction), a thickness of the housing 110 may be reduced.

Figure 6:
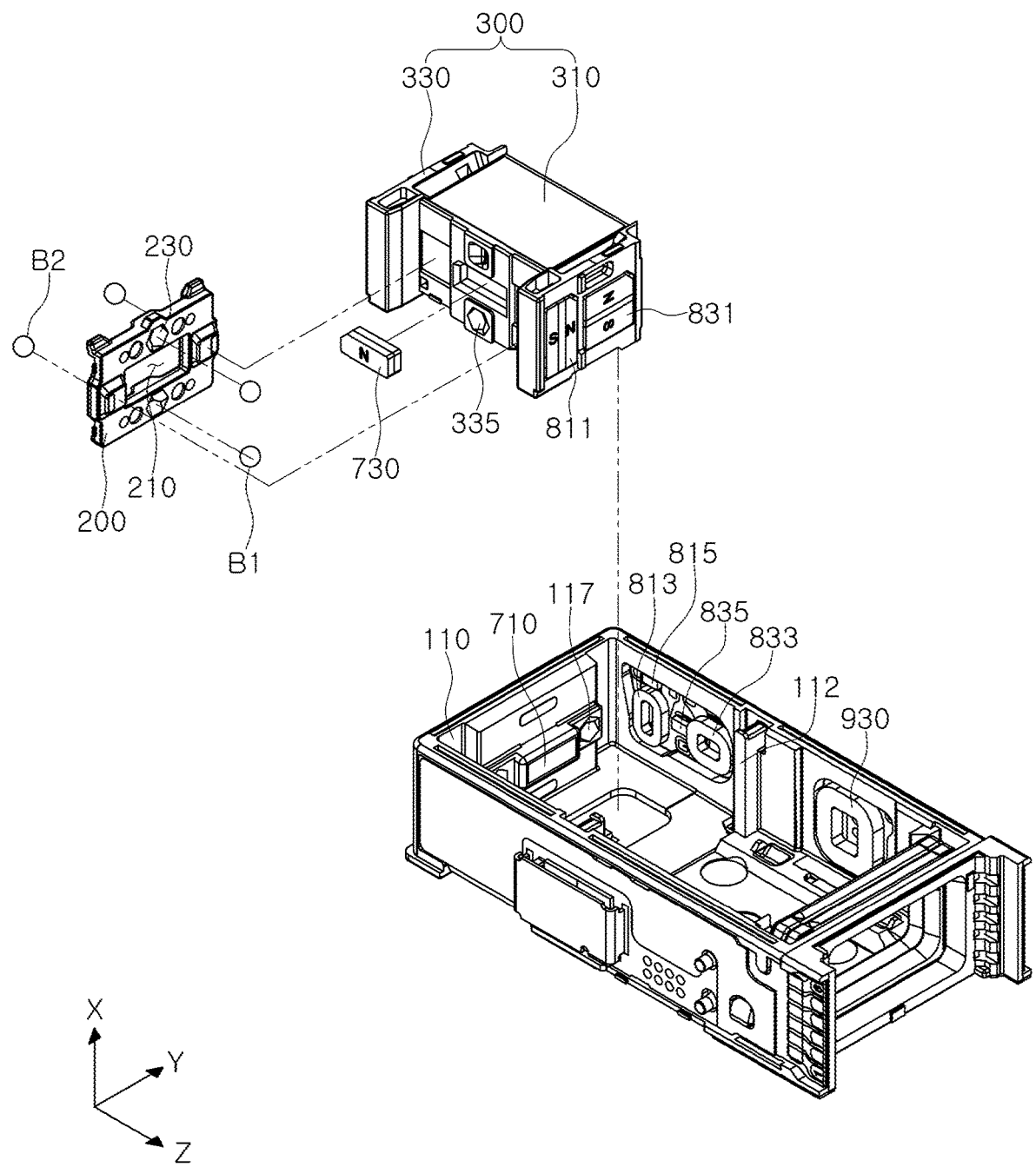
FIG. 6 is an exploded perspective view of a housing, a guide member, and a reflection module of the camera module, according to an embodiment.
Figure 7:
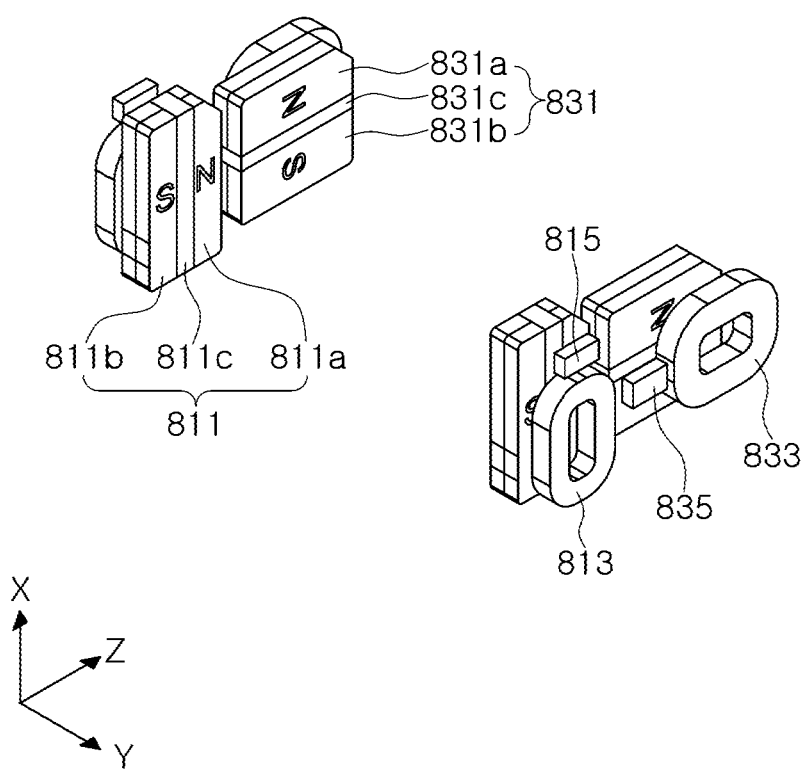
FIG. 7 is a perspective view of a first driving portion and a second driving portion of the camera module, according to an embodiment.
Figure 8A:
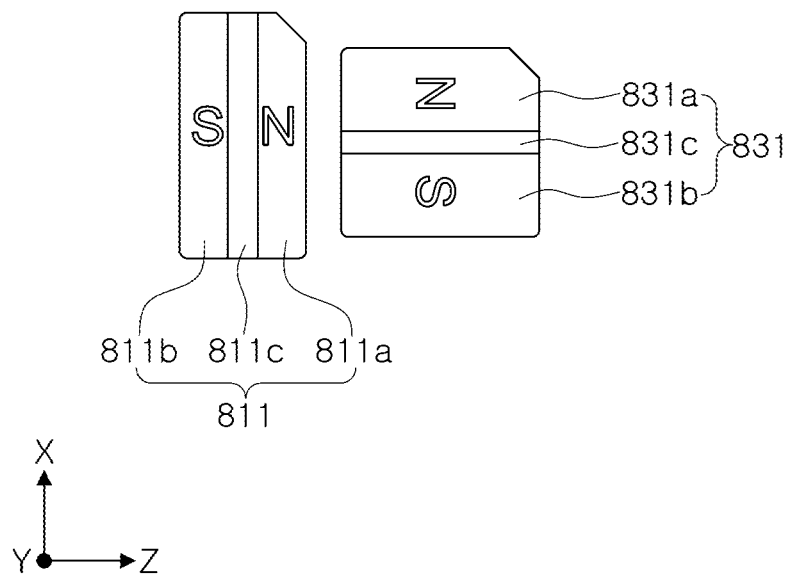
FIG. 8A is a side view of a first magnet and a second magnet.
Figure 8B:
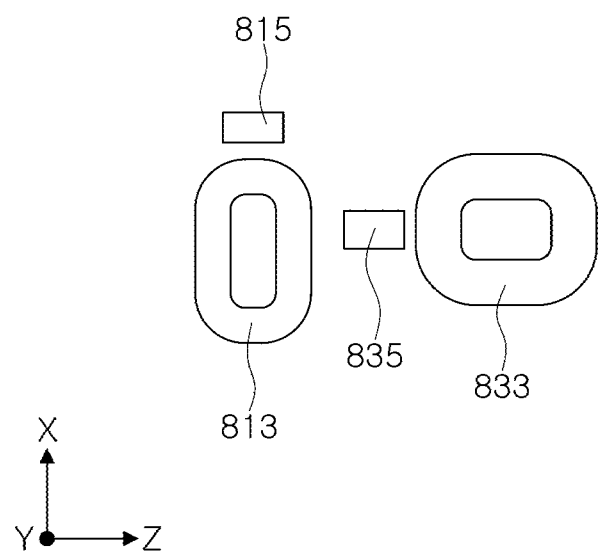
FIG. 8B is a side view of a first coil and a second coil.

FIG. 6 is an exploded perspective view of the housing 110, a guide member 200, and the reflection module 300 of the camera module 1000, according to an embodiment. FIG. 7 is a perspective view of the first driving portion 810 and the second driving portion 830 of the camera module 1000, according to an embodiment. FIG. 8A is a side view of a first magnet 811 and a second magnet 831. and FIG. 8B is a side view of a first coil 813 and a second coil 833.

Figure 9A:
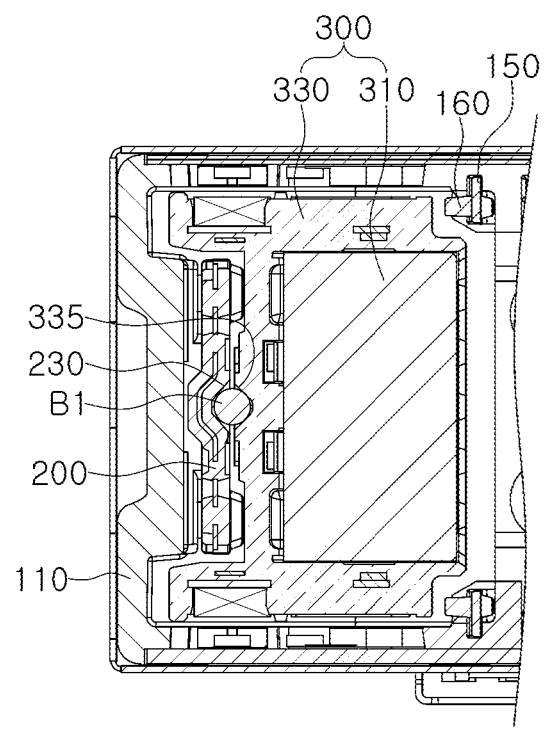
FIGS. 9A to 9C are views schematically illustrating a state in which a reflection module pivots around a first axis (an X-axis) as a rotation axis, according to an embodiment.
Figure 9B:
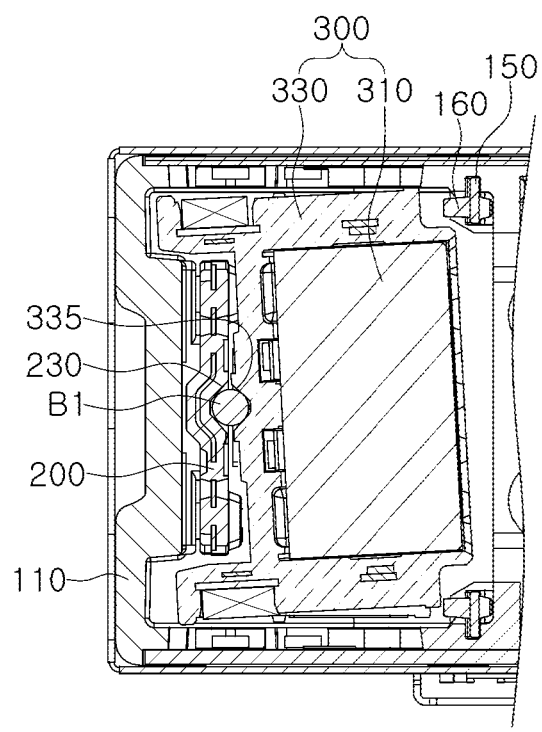
Figure 9C:
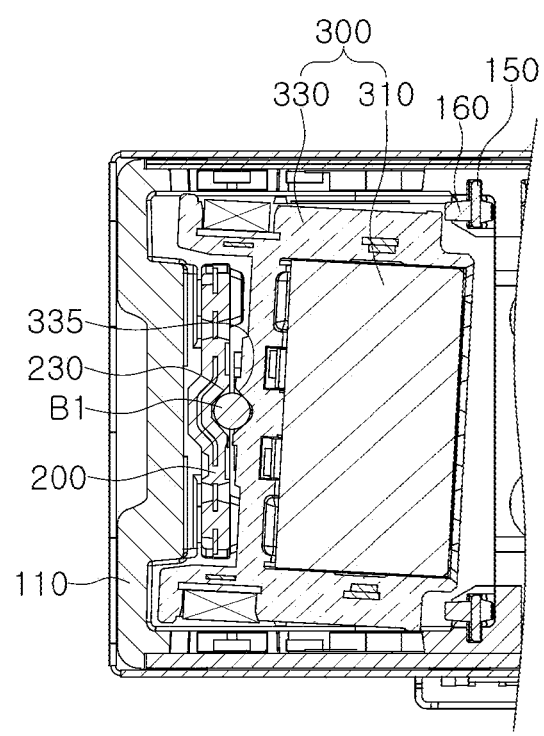
Figure 9C:
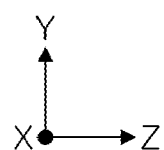

FIGS. 9A to 9C are views schematically illustrating a state in which the reflection module 300 pivots around a first axis (an X axis) as a rotation axis.

Figure 10A:
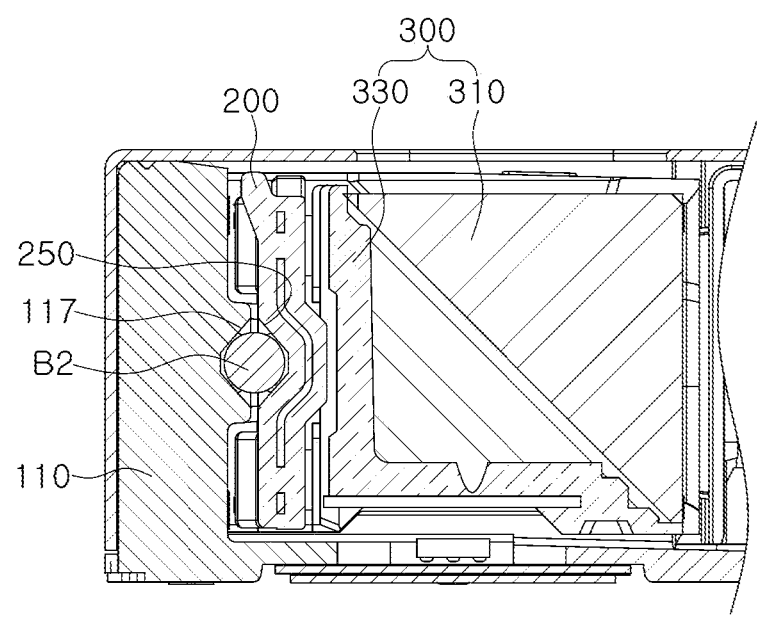
FIGS. 10A to 10C are views schematically illustrating a state in which a reflection module pivots around a second axis (a Y-axis) as a rotation axis.
Figure 10B:
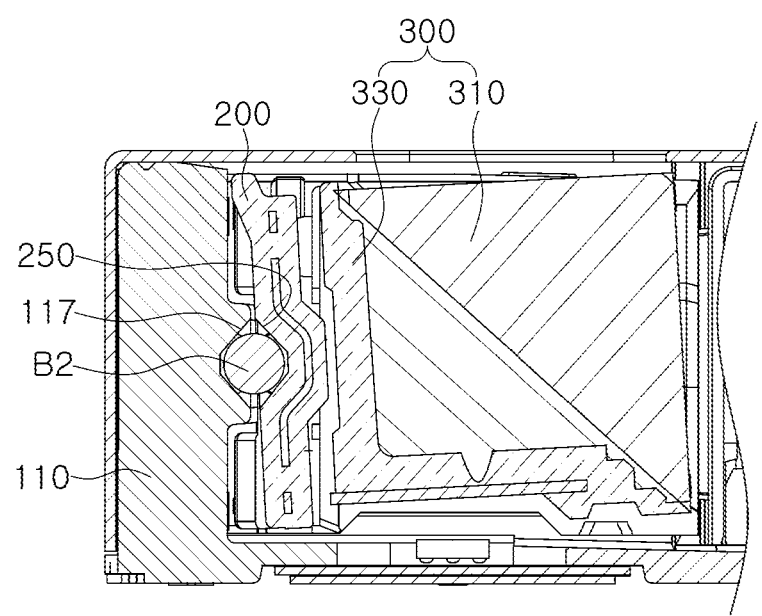
Figure 10C:
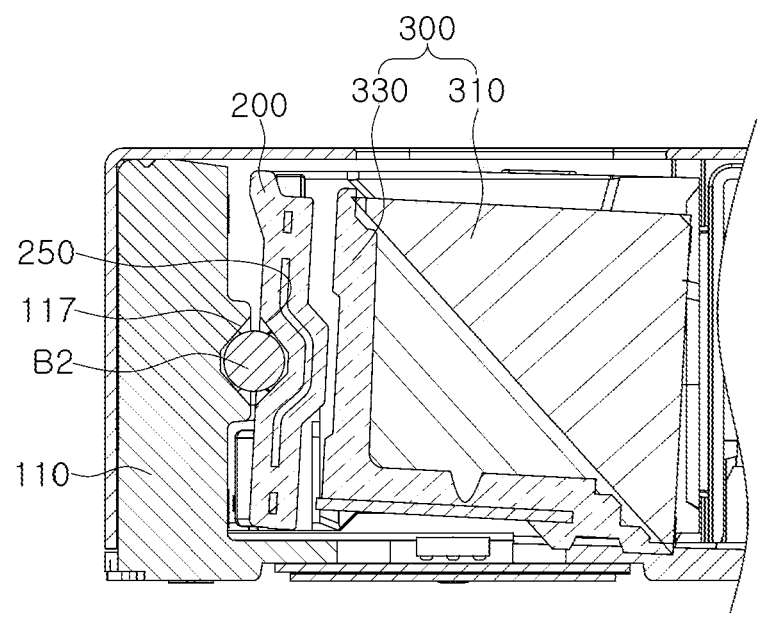

FIGS. 10A to 10C are views schematically illustrating a state in which the reflection module pivots around the second axis (a Y-axis) as a rotation axis.

Referring to FIG. 6, the reflection module 300 and the lens module 400 may be arranged in an internal space formed by a housing 110. The housing 110 may be provided with a protruding wall 112. As an example, the protruding wall 112 may have a shape protruding from both internal side surfaces of the housing 110.

The internal space of the housing 110 may be divided into a space in which the reflection module 300 is disposed and a space in which the lens module 400 is disposed, by the protruding wall 112. For example, the reflection module 300 may be disposed in front of the protruding wall 112 in the optical axis direction (the Z-axis direction), and the lens module 400 may be disposed behind the protruding wall 112 in the optical axis direction (the Z-axis direction).

The reflection module 300 may be disposed in the internal space of the housing 110, and may be pulled toward the housing 110. For example, the reflection module 300 may be pulled toward the internal side surface of the housing 110 in the optical axis direction (the Z-axis direction).

To this end, magnetic materials may be disposed on the housing 110 and the reflection module 300, respectively. At least one of the magnetic materials disposed on the housing 110 and the reflection module 300 may be a magnet. For example, a pulling yoke 710 may be disposed on the housing 110 and a pulling magnet 730 may be disposed in the reflection module 300. The pulling yoke 710 and the pulling magnet 730 may be disposed to oppose each other in the optical axis direction (the Z-axis direction). The pulling yoke 710 may be a magnetic material.

Therefore, the pulling yoke 710 and the pulling magnet 730 may generate attractive force in the optical axis direction (the Z-axis direction), and accordingly, the reflection module 300 may be pressed toward the housing 110.

Mounting positions of the pulling yoke 710 and the pulling magnet 730 may be interchanged. In another embodiment, the pulling magnet 730 may be provided as a plurality of pulling magnets, and the plurality of pulling magnets may be mounted on the housing 110 and the reflection module 300, respectively.

As shown in FIG. 6, the guide member 200 may be disposed in front of the reflection module 300. The guide member 200 may be disposed between the internal side surface of the housing 110 and the reflection module 300. For example, the guide member 200 may be disposed between the internal side surface of the housing 110 on which the pulling yoke 710 is disposed and the reflection module 300 on which the pulling magnet 730 is disposed.

The guide member 200 may have a plate shape, and may have a through-hole 210 such that the pulling yoke 710 and the pulling magnet 730 may directly oppose each other.

The internal side surface of the housing 110 may include a protrusion 111 protruding in the optical axis direction (the Z-axis direction), and the protrusion 111 may be disposed in the through-hole 210 of the guide member 200 (see FIG. 3A). The pulling yoke 710 may be disposed on the protrusion 111.

Since the pulling yoke 710 and the pulling magnet 730 may be disposed to oppose each other, force pulling the reflection module 300 may be maximized. In addition, a camera module may be downsized in the optical axis direction (the Z-axis direction).

Since attractive force acts between the pulling yoke 710 and the pulling magnet 730 in the optical axis direction (the Z-axis direction), the reflection module 300 and the guide member 200 may be pressed toward the housing 110 in the optical axis direction (the Z-axis direction).

Still referring to FIG. 6, a first ball member B1 may be disposed between the guide member 200 and the reflection module 300, and a second ball member B2 may be disposed between the housing 110 and the guide member 200.

The first ball member B1 may include a plurality of ball members spaced apart from each other on the first axis (the X axis), and the second ball member B2 may include a plurality of ball members spaced apart from each other on the second axis (the Y axis).

Due to attractive force between the pulling yoke 710 and the pulling magnet 730, the first ball member B1 may be in contact with the guide member 200 and the reflection module 300, and the second ball member B2 may be in contact with the housing 110 and the guide member 200.

A receiving groove in which the first ball member B1 is accommodated may be disposed on a surface of the guide member 200 and a surface of the reflection module 300, opposing each other, respectively. For example, a first receiving groove 335 and a second receiving groove 230 may be disposed on a surface of the reflecting module 300 and a surface of the guide member 200, opposing each other, respectively, in the optical axis direction (the Z-axis direction), and the first ball member B1 may be disposed between the first receiving groove 335 and the second receiving groove 230.

The first receiving groove 335 and the second receiving groove 230 may include a plurality of receiving grooves disposed to be spaced apart from each other, respectively, on the first axis (the X axis).

A receiving groove in which the second ball member B2 is accommodated may be disposed on a surface of the housing 110 and a surface of the guide member 200, opposing each other, respectively. For example, a third receiving groove 250 and a fourth receiving groove 117 may be disposed on a surface of the housing 110 and a surface of the guide member 200, opposing each other, in the optical axis direction (the Z-axis direction), and the second ball member B2 may be disposed between the third receiving groove 250 and the fourth receiving groove 117.

The third receiving groove 250 and the fourth receiving groove 117 may include a plurality of receiving grooves, disposed to be spaced apart from each other, respectively, on the second axis (the Y axis).

A camera module 1000 may pivot the reflection module 300 to perform OIS in capturing an image.

For example, when shaking occurs during capturing of an image, a relative displacement corresponding to the shaking may be applied to the reflection module 300 to perform OIS.

The reflection module 300 may pivot around the first axis (the X axis) and the second axis (the Y axis). For example, the reflection module 300 may pivot relative to the guide member 200 on the first axis (the X axis) as a rotation axis. In addition, the reflection module 300 may pivot relative to the housing 110, together with the guide member 200, on the second axis (the Y axis) as a rotation axis.

The first ball member B1 may be disposed between the guide member 200 and the reflection module 300, and the first ball member B1 may include a plurality of ball members disposed on the first axis (the X axis). Therefore, the reflection module 300 may pivot around the first axis (the X axis) as a rotation axis while being supported by the first ball member B1 (see FIGS. 9A to 9C).

Since the first ball member B1 may include a plurality of ball members disposed on the first axis (the X axis), the reflection module 300 may pivot relative to the guide member 200 on the first axis (the X axis) as a rotation axis. The reflection module 300 may be restricted from pivot relative to the guide member 200 on the second axis (the Y axis) as a rotation axis.

The second ball member B2 may be disposed between the housing 110 and the guide member 200, and the second ball member B2 may include a plurality of ball members disposed on the second axis (the Y axis). Therefore, the guide member 200 may pivot on the second axis (the Y axis) as a rotation axis while being supported by the second ball member B2 (see FIGS. 10A to 10C).

Since the second ball member B2 may include a plurality of ball members disposed on the second axis (the Y axis), the guide member 200 may pivot relative to the housing 110 on the second axis (the Y axis) as a rotation axis. The guide member 200 may be restricted from pivot relative to the housing 110 on the first axis (the X axis) as a rotation axis.

In this case, since the reflection module 300 may be restricted from pivoting relative to the guide member 200 on the second axis (the Y axis) as a rotation axis, the reflection module 300 may pivot relative to the housing 110, together with the guide member 200, on the second axis (the Y axis) as a rotation axis.

A driving portion may be provided to pivot the reflection module 300. For example, the camera module 1000 may include the first driving portion 810 configured to pivot the reflection module 300 on the first axis (the X axis) as a rotation axis, and the second driving portion 830 configured to pivot the reflection module 300 on the second axis (the Y axis) as a rotation axis (see FIGS. 4 and 7).

Referring to FIGS. 4 and 7, the first driving portion 810 may include the first magnet 811 and the first coil 813.

The first magnet 811 may be mounted on the reflection module 300. For example, the first magnet 811 may be disposed on a side wall of the holder 330.

The first coil 813 may be disposed to oppose the first magnet 811 in a direction perpendicular to the optical axis direction (the Z-axis direction). For example, the housing 110 may be provided with a through-hole 113 in which the first coil 813 is disposed, and the first coil 813 may be disposed in the through-hole 113 to oppose the first magnet 811 in the second axial direction (the Y-axis direction). The first coil 813 may be provided on a substrate 170 coupled to the housing 110 (see FIG. 4).

The first magnet 811 may include a plurality of magnets disposed on both side walls of the holder 330, and the first coil 813 may also include a plurality of coils corresponding to the first magnet 811.

Referring to FIG. 7, a surface of the first magnet 811 facing the first coil 813 may have a first polarity region 811a and a second polarity region 811b that are magnetized in the optical axis direction (the Z-axis direction).

For example, on a surface of the first magnet 811 facing the first coil 813, a first polarity region 811a, a neutral region 811c, and a second polarity region 811b may be sequentially arranged in the optical axis direction (the Z-axis direction). The first polarity region 811a may be an N-pole or an S-pole, and the second polarity region 811b may be a pole opposite to the pole of the first polarity region 811a (an S-pole or an N-pole). The neutral region 811c may be provided between the first polarity region 811a and the second polarity region 811b.

The first magnet 811 and the first coil 813 may generate driving force in a direction perpendicular to directions in which the first magnet 811 and the first coil 813 face each other. For example, the first magnet 811 and the first coil 813 may generate driving force in the optical axis direction (the Z-axis direction).

Therefore, due to the driving force of the first magnet 811 and the first coil 813, the reflection module 300 may pivot around the first axis (the X axis) as a rotation axis.

Both side walls of the holder 330 may protrude in the optical axis direction (the Z-axis direction) to cover the guide member 200 (see FIGS. 4 and 6). The first magnet 811 may be disposed on both side walls of the holder 330 protruding to cover the guide member 200.

The neutral region 811c of the first magnet 811 may be located on the same line as a center of the first ball member B1 in the second axis direction (the Y-axis direction). Alternatively, the neutral region 811c of the first magnet 811 may be located forward in the optical axis direction (the Z-axis direction), as compared to the center of the first ball member B1. Therefore, the reflection module 300 may pivot even by relatively small driving force.

Referring to FIG. 7, the second driving portion 830 may include the second magnet 831 and the second coil 833.

The second magnet 831 may be mounted on the reflection module 300. For example, the second magnet 831 may be disposed on a side wall of the holder 330.

The second coil 833 may be disposed to oppose the second magnet 831 in a direction, perpendicular to the optical axis direction (the Z-axis direction). For example, the housing 110 may be provided with a through-hole 113 in which the second coil 833 is disposed, and the second coil 833 may be disposed in the through-hole 113 to oppose the second magnet 831 in the second axial direction (the Y-axis direction). The second coil 833 may be provided on the substrate 170 coupled to the housing 110 (see FIG. 4).

The second magnet 831 may include a plurality of magnets, disposed on both side walls of the holder 330, and the second coil 833 may also include a plurality of coils corresponding to the second magnet 831.

A surface of the second magnet 831 facing the second coil 833 may have a first polarity region 831a and a second polarity region 831b that are magnetized in a direction perpendicular to the optical axis direction (the Z-axis direction).

For example, on a surface of the second magnet 831 facing the second coil 833, a first polarity region 831a, a neutral region 831c, and a second polarity region 831b may be sequentially arranged in the first axis direction (the X-axis direction). The first polarity region 831a may be an N-pole or an S-pole, and the second polarity region 831b may be a pole opposite to the pole of the first polarity region 831a (an S-pole or an N-pole). A neutral region 831c may be provided between the first polarity region 831a and the second polarity region 831b.

The second magnet 831 and the second coil 833 may generate driving force in a direction perpendicular to directions in which the second magnet 831 and the second coil 833 face each other. For example, the second magnet 831 and the second coil 833 may generate driving force in the first axis direction (the X-axis direction).

Therefore, due to the driving force of the second magnet 831 and the second coil 833, the reflection module 300 may pivot on the guide member 200 on the second axis (the Y axis) as a rotation axis.

The second magnet 831 may be disposed rearward in the optical axis direction (the Z-axis direction), as compared to the first magnet 811. For example, the second magnet 831 may be disposed closer to the lens module 400, as compared to the first magnet 811.

A separation distance between a center of the second ball member B2 and the neutral region 831c of the second magnet 831 in the optical axis direction (the Z-axis direction) may be greater than a separation distance between the center of the second ball member B2 and the neutral region 811c of the first magnet 811 in the optical axis direction (the Z-axis direction). Therefore, the reflection module 300 may pivot even by relatively small driving force.

The first driving portion 810 and the second driving portion 830 may generate driving force in respective directions perpendicular to each other.

The reflection module 300 may pivot around the first axis (the X axis) as a rotation axis (see FIGS. 9A, 9B, and 9C), and the reflection module 300 and the guide member 200 may pivot together around the second axis (the Y axis) as a rotation axis (see FIGS. 10A, 10B, and 10C). For example, the reflection module 300 may pivot around the first axis (the X axis) as a rotation axis in between left and right directions, and may pivot around the second axis (the Y axis) as a rotation axis in between upward and downward directions.

In this case, referring to FIGS. 4, and 9A to 10C, the camera module 1000 may include a stopper 150 that may be fitted to the protruding wall 112 of the housing 110.

The stopper 150 may be provided to have a hook shape, and may be disposed in a state in which a hook portion thereof may be engaged and retained by an upper portion of the protruding wall 112.

The stopper 150 may limit a pivot range of the reflection module 300.

A buffer member 160 may be attached to the stopper 150. The buffer member 160 may be made of a material having elasticity. Therefore, when the reflection module 300 collides with the stopper 150, impact and noise may be reduced.

Referring to FIGS. 7 and 8A, a length of the first magnet 811 in the optical axis direction (the Z-axis direction) may be shorter than a length of the second magnet 831 in the optical axis direction (the Z-axis direction). In addition, a length of the first magnet 811 in the first axis direction (the X-axis direction) may be longer than a length of the second magnet 831 in the first axis direction (the X-axis direction).

For example, the first polarity region 811a, the neutral region 811c, and the second polarity region 811b of the first magnet 811 may be formed to be elongated in the first axis direction (the X-axis direction), and the first polarity region 831a, the neutral region 831c, and the second polarity region 831b of the second magnet 831 may be formed to be elongated in the optical axis direction (the Z-axis direction).

Referring to FIGS. 7 and 8B, a length of the first coil 813 in the optical axis direction (the Z-axis direction) may be shorter than a length of the second coil 833 in the optical axis direction (the Z-axis direction). In addition, a length of the first coil 813 in the first axial direction (the X-axis direction) may be longer than a length of the second coil 833 in the first axial direction (the X-axis direction).

For example, the first coil 813 has a shape having a length in the first axis direction (the X-axis direction) greater than a width in the optical axis direction (the Z-axis direction), and the second coil 833 has a shape having a length in the optical axis direction (the Z-axis direction) greater than a width in the first axis direction (the Y-axis direction).

The camera module 1000 may use a closed loop control method that senses and feeds back a position of the reflection module 300.

Therefore, a first position sensor 815 and a second position sensor 835 may be provided to sense the position of the reflection module 300.

The first position sensor 815 may be disposed on the housing 110, and may be disposed to oppose the first magnet

811. The second position sensor 835 may be disposed on the housing 110, and may be disposed to oppose the second magnet 831.

Types of the first position sensor 815 and the second position sensor 835 may be different. As an example, the first position sensor 815 may be a Hall sensor, and the second position sensor 835 may be a tunnel magnetoresistance (TMR) sensor.

The first position sensor 815 may be disposed outside the first coil 813. For example, the first position sensor 815 may be disposed upward in the first axis direction (the X-axis direction), as compared to the first coil 813.

The first position sensor 815 may be disposed to oppose the neutral region 811c of the first magnet 811. The first position sensor 815 may be disposed to oppose the neutral region 811c of the first magnet 811, and oppose even a portion of the first polarity region 811a and a portion of the second polarity region 811b of the first magnet 811.

The second position sensor 835 may be disposed outside the second coil 833. For example, the second position sensor 835 may be disposed forward in the optical axis direction (the Z-axis direction), as compared to the second coil 833. The second position sensor 835 may be disposed between the first coil 813 and the second coil 833.

The second position sensor 835 may be disposed to oppose the neutral region 831c of the second magnet 831. The second position sensor 835 may be disposed to oppose the neutral region 831c of the second magnet 831, and oppose even a portion of the first polarity region 831a and a portion of the second polarity region 831b of the second magnet 831.

The first position sensor 815 may sense a position of the reflection module 300, when the reflection module 300 pivots around the first axis (the X axis) as a rotation axis, and the second position sensor 835 may sense a position of the reflection module 300, when the reflection module 300 pivots around the second axis (the Y axis) as a rotation axis. That is, the first position sensor 815 may sense a rotational position of the reflection module 300 about the first axis (the X axis), and the second position sensor 835 may sense a rotational position of the reflection module 300 about the second axis (the Y axis).

In this case, sensitivity of the first position sensor 815 may be different from sensitivity of the second position sensor 835. For example, sensitivity of the second position sensor 835 may be greater than sensitivity of the first position sensor 815.

When the reflection module 300 pivots around the first axis (the X-axis) as a rotation axis, an inclination angle of a reflection surface 312 of a reflective member 310 may not be changed. When the reflection module 300 pivots around the second axis (the Y-axis) as a rotation axis, the inclination angle of the reflective surface 312 of the reflective member 310 may be changed.

For example, when the reflection module 300 pivots around the second axis (the Y-axis) as a rotation axis, a reflection angle of light may increase. Therefore, when the sensitivity of the first position sensor 815 and the sensitivity of the second position sensor 835 are the same, it may be difficult to sense an exact position of the reflection module 300.

Therefore, the camera module 1000 may be configured such that the sensitivity of the second position sensor 835 is greater than sensitivity of the first position sensor 815 to sense an exact position of the reflection module 300, and to improve OIS performance.

The first position sensor 815 may have a sensitivity of less than 1.0 mV/mT. The second position sensor 835 may have a sensitivity of 1.0 mV/mT or higher. Alternatively, the second position sensor 835 may have a sensitivity of 2.0 mV/mT or higher. For example, the sensitivity of the position sensor may be measured by setting an input voltage to 3V at room temperature (e.g., 25° C.).

Figure 11:
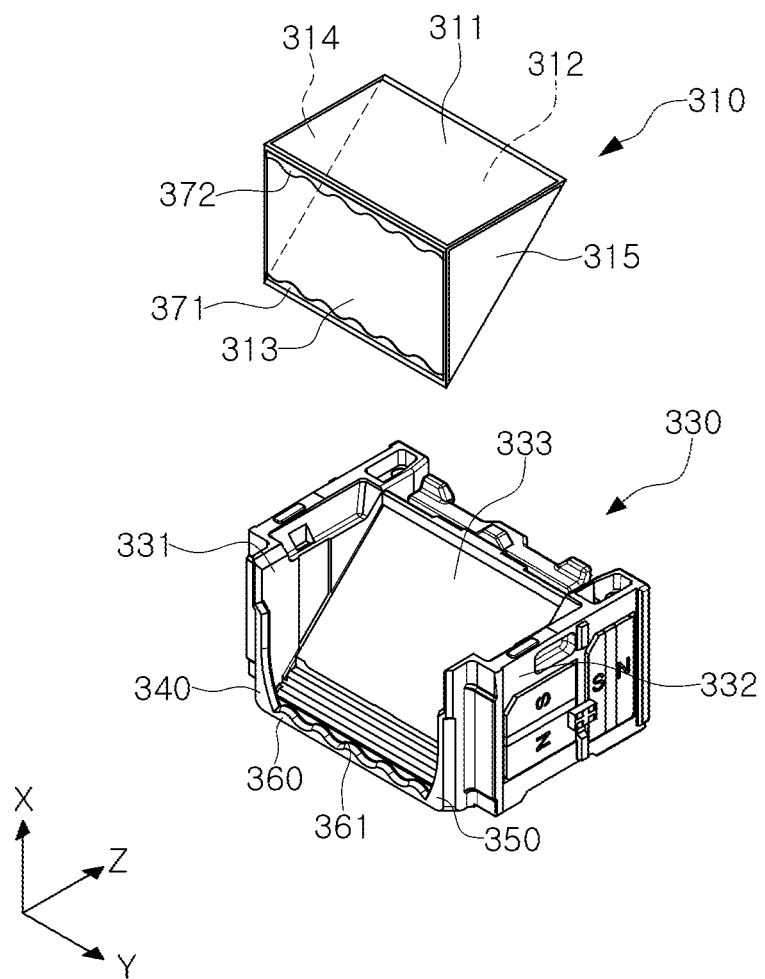
FIG. 11 is a schematic exploded perspective view of a reflection module, according to an embodiment.
Figure 12:
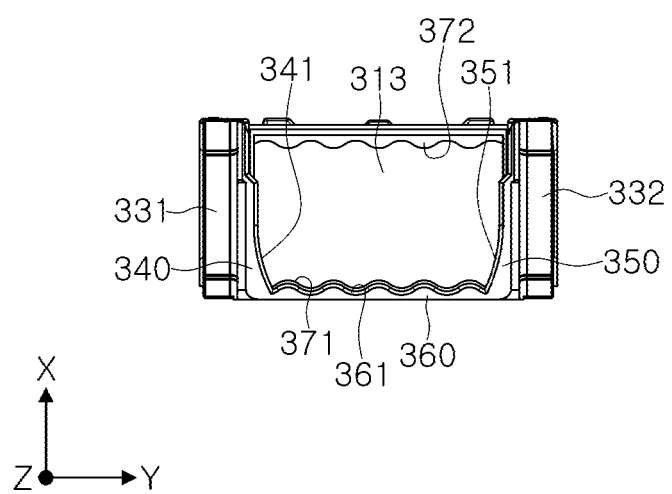
FIG. 12 is a schematic front view of a reflection module, according to an embodiment.

FIG. 11 is a schematic exploded perspective view of the reflection module 300. FIG. 12 is a schematic front view of the reflection module 300.

Referring to FIGS. 11 and 12, the reflection module 300 may include the reflective member 310 and the holder 330 on which the reflective member 310 is mounted.

The reflective member 310 may be configured to change a traveling direction of light. In this embodiment, the reflective member 310 may be a prism, but may as also be a mirror.

The reflective member 310 may have a shape obtained by dividing a rectangular parallelepiped or a regular cube in a diagonal direction, and may include an incident surface 311, a reflective surface 312, and an emitting surface 313. The reflective member 310 may include three (3) rectangular surfaces and two (2) triangular surfaces. For example, the incident surface 311, the reflective surface 312, and the emitting surface 313 of the reflective member 310 may be rectangular, and side surfaces 314 and 315 of the reflective member 310 may be substantially triangular.

Since an edge connecting the incident surface 311 and the emitting surface 313 has a sharp shape, there may be a risk of being damaged by impact. When the edge connecting the incident surface 311 and the emitting surface 313 is damaged by impact, a flare phenomenon may be caused due to unintended reflection of light.

Therefore, a chamfer may be provided at an edge in which the incident surface 311 and the emitting surface 313 of the reflective member 310 are connected to prevent damage to the reflective member 310 due to impact or the like.

For example, the chamfer may be formed to have a predetermined angle with respect to the incident surface 311 and the emitting surface 313. An angle between the chamfer and the incident surface 311 and an angle between the chamfer and the emitting surface 313 may be obtuse angles.

Light-shielding layers 371 and 372 may be provided on the emitting surface 313. For example, the light-shielding layers 371 and 372 may be provided on a portion of the emitting surface 313 adjacent to the incident surface 311 and/or a portion of the emitting surface 313 adjacent to the reflective surface 312.

For example, the light-shielding layers 371 and 372 may be provided on an upper edge and/or a lower edge of the emitting surface 313.

The light-shielding layers 371 and 372 may be formed by attaching a light-shielding film to the emitting surface 313 or painting a light-shielding paint on the emitting surface 313.

Not all light passing through the emitting surface 313 may be used for image formation, and a flare phenomenon may occur due to the light not used for image formation. Therefore, the light-shielding layers 371 and 372 on the emitting surface 313 may be provided to block unnecessary light.

Even when unnecessary light is blocked by the light-shielding layers 371 and 372, light may be reflected from edges of the light-shielding layers 371 and 372. In this case, a flare phenomenon may still occur.

Therefore, in this embodiment, the edges of the light-shielding layers 371 and 372 may have a curved shape. For example, the edges of the light-shielding layers 371 and 372 may have a wave pattern shape. Therefore, even when light is reflected from the edges of the light-shielding layers 371 and 372, the reflected light may be scattered to prevent a flare phenomenon.

The holder 330 may include a first side wall 331 and a second side wall 332, respectively covering side surfaces of the reflective member 310. The first side wall 331 may be disposed to cover one side surface 314 of the reflective member 310, and the second side wall 332 may be disposed to cover the other side surface 315 of the reflective member 310.

Further, the holder 330 may include a mounting surface 333 on which the reflective member 310 is mounted. The mounting surface 333 may be disposed between the first side wall 331 and the second side wall 332, and the mounting surface 333 may be an inclined surface.

For example, the mounting surface 333 may be an inclined surface inclined by approximately 45° with respect to the optical axis (the Z axis) of a plurality of lenses. The reflective surface 312 of the reflective member 310 may be coupled to the mounting surface 333 of the holder 330.

Light that has passed through the incident surface 311 may be reflected from the reflective surface 312, and may pass through the emitting surface 313.

When light that has passed through the incident surface 311 is reflected from a portion other than the reflective surface 312 (for example, the side surfaces 314 and 315 of the reflective member 310), a flare phenomenon may be caused.

In addition, since not all light reflected from the reflective surface 312 is used for image formation, even when light is reflected from the reflective surface 312, light not used for image formation may cause a flare phenomenon.

The camera module 1000 is configured such that the holder 330 covers a portion of the emitting surface 313 of the reflective member 310, to prevent occurrence of a flare phenomenon due to unnecessary light. The holder 330 may include a cover portion configured to cover a portion of the emitting surface 313 of the reflective member 310. The cover portion may include a first cover portion 340 and a second cover portion 350.

The first cover portion 340 may extend from the first side wall 331 in a direction perpendicular to the optical axis (the Z axis) (for example, in the second axis direction (the Y-axis direction)), and the second cover portion 350 may extend from the second side wall 332 in a direction, perpendicular to the optical axis (the Z axis) (for example, in the second axis direction (the Y-axis direction)). For example, the first cover portion 340 and the second cover portion 350 may be arranged to extend toward each other in the second axis direction.

The first cover portion 340 and the second cover portion 350 may respectively cover portions of the emitting surface 313 of the reflective member 310.

As an example, the first cover portion 340 may be disposed to cover a portion of the emitting surface 313 connected to the one side surface 314 of the reflective member 310, and the second cover portion 350 may be disposed to cover a portion of the emitting surface 313 connected to the other side surface 315 of the reflective member 310.

The first cover portion 340 and the second cover portion 350 may have a shape in which an area covering the emitting surface 313 of the reflective member 310 increases toward a bottom surface of the housing 110.

The first cover portion 340 and the second cover portion 350 may have surfaces 341 and 351, respectively, opposing each other. The surfaces 341 and 351 may be curved, respectively.

The surfaces 341 and 351 may each include with an uneven portion or a light-shielding layer to scatter light. As an example, the uneven portion may be a surface formed to be rough by corrosion treatment, and the light-shielding layer may be formed by attaching a light-shielding film to or painting a light-shielding paint on a surface at which the first cover portion 340 and the second cover portion 350 oppose each other.

Since unnecessary light may be blocked by the first cover portion 340 and the second cover portion 350, and light may be scattered by the uneven portion provided on the surfaces 341 and 351 on which the first cover portion 340 and the second cover portion 350 oppose each other, a flare phenomenon may be suppressed.

The cover portion further may include a third cover portion 360. The third cover portion 360 may be disposed to cover a portion of the emitting surface 313 of the reflective member 310. For example, the third cover portion 360 may be disposed to cover a portion of the emitting surface 313 connected to the reflective surface 312 of the reflective member 310.

The third cover portion 360 may be configured to connect the first cover portion 340 and the second cover portion 350 to each other, and may extend from an end of the mounting surface 333 of the holder 330 in a direction perpendicular to the optical axis (the Z axis) (for example, the first axis direction (the X-axis direction)).

The third cover portion 360 may include a plurality of protrusions 361. The plurality of protrusions 361 may be arranged to be connected to each other, to form a wave pattern. A light-shielding layer may be provided on the plurality of protrusions 361. The light-shielding layer may be formed by attaching a light-shielding film to or painting a light-shielding paint on the plurality of protrusions 361.

Since unnecessary light may be blocked by the third cover portion 360 and light may be scattered by the plurality of protrusions 361 of the third cover portion 360, a flare phenomenon may be suppressed.

As described above, the camera module 1000 may include a light-shielding structure on upper, lower, left, and right edges of the emitting surface 313 of the reflective member 310 to prevent a flare phenomenon caused by unnecessary light.

Figure 13:
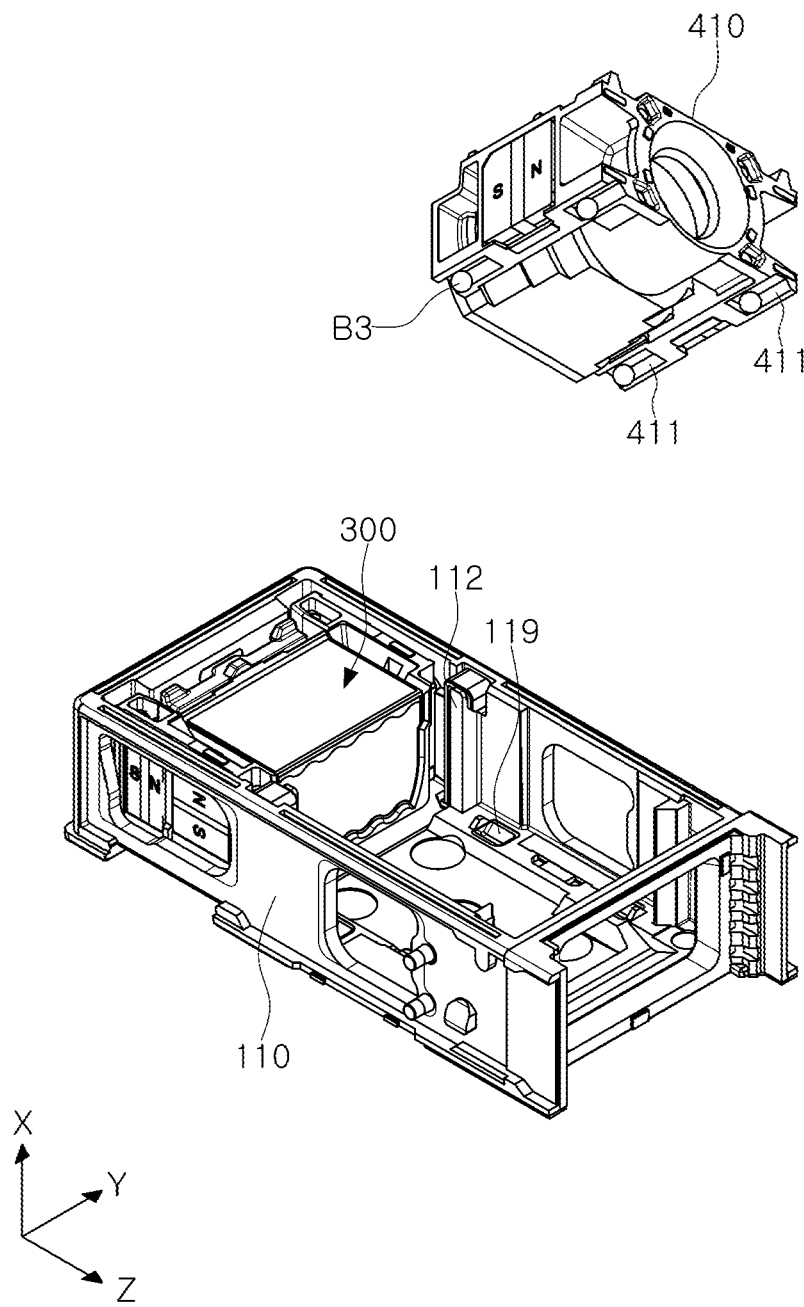
FIG. 13 is an exploded perspective view of a housing and a lens module of the camera module, according to an embodiment.

FIG. 13 is an exploded perspective view of the housing 110 and the lens module 400 of the camera module 1000, according to an embodiment.

Referring to FIGS. 4 and 13, the reflection module 300 and the lens module 400 may be disposed in the internal space of the housing 110. The reflection module 300 may be disposed in front of the protruding wall 112 of the housing 110, and the lens module 400 may be disposed behind the protruding wall 112 of the housing 110.

The lens module 400 may be moved in the optical axis direction (the Z-axis direction) to perform focus adjustment. A third ball member B3 may be disposed between the lens module 400 and the housing 110, and the lens module 400 may be guided by the third ball member B3 to be moved in the optical axis direction (the Z-axis direction).

A first guide groove 411 and a second guide groove 119 may be provided on surfaces on which the lens module 400 and the housing 110 oppose each other in the first axis direction (the X-axis direction). The first guide groove 411 and the second guide groove 119 may be elongated in the optical axis direction (the Z-axis direction).

The third ball member B3 may be disposed between the first guide groove 411 and the second guide groove 119, and may roll along the first guide groove 411 and the second guide groove 119.

Therefore, when driving force is generated in the optical axis direction (the Z-axis direction), the lens module 400 may be guided by the third ball member B3 and may be moved in the optical axis direction (the Z-axis direction).

A third driving portion 900 may be provided to move the lens module 400 in the optical axis direction (the Z-axis direction) (see FIG. 4).

The third driving portion 900 may include a third magnet 910 and a third coil 930.

The third magnet 910 may be mounted on the lens module 400. As an example, the third magnet 910 may be disposed on a side surface of the lens module 400.

The third coil 930 may be disposed to oppose the third magnet 910 in a direction perpendicular to the optical axis direction (the Z-axis direction). For example, the housing 110 may include a through-hole 115 in which the third coil 930 is disposed, and the third coil 930 may be disposed in the through-hole 115 to oppose the third magnet 910 in the second axial direction (the Y-axis direction). The third coil 930 may be disposed on the substrate 170, coupled to the housing 110.

The third magnet 910 may include a plurality of magnets disposed on both side surfaces of the lens module 400, and the third coil 930 may also include a plurality of coils corresponding to the third magnet 910.

A surface of the third magnet 910 facing the third coil 930 may have a first polarity region 911 and a second polarity region 913, magnetized in the optical axis direction (the Z-axis direction).

For example, on a surface of the third magnet 910 facing the third coil 930, a first polarity region 911, a neutral region 915, and a second polarity region 913 may be sequentially arranged in the optical axis direction (the Z-axis direction). The first polarity region 911 may be an N-pole or an S-pole, and the second polarity region 913 may be a pole opposite to the pole of the first polarity region 911 (an S-pole or an N-pole). The neutral region 915 may be disposed between the first polarity region 911 and the second polarity region 913.

The third magnet 910 and the third coil 930 may generate driving force in a direction perpendicular to directions in which the third magnet 910 and the third coil 930 oppose each other. For example, the third magnet 910 and the third coil 930 may generate driving force in the optical axis direction (the Z-axis direction).

Therefore, due to the driving force of the third magnet 910 and the third coil 930, the lens module 400 may be moved in the optical axis direction (the Z-axis direction).

The camera module may use a closed loop control method that senses and feeds back a position of the lens module 400.

Therefore, a third position sensor 950 may be provided to sense the position of the lens module 400.

The third position sensor 950 may be disposed in a hollow portion formed in a center of the third coil 930. The third position sensor 950 may be a Hall sensor.

The third position sensor 950 may be disposed to oppose the neutral region 915 of the third magnet 910. The third position sensor 950 may also be disposed to oppose the neutral region 915 of the third magnet 910, and oppose a portion of the first polarity region 911 and a portion of the second polarity region 913 of the third magnet 910.

Figure 14:
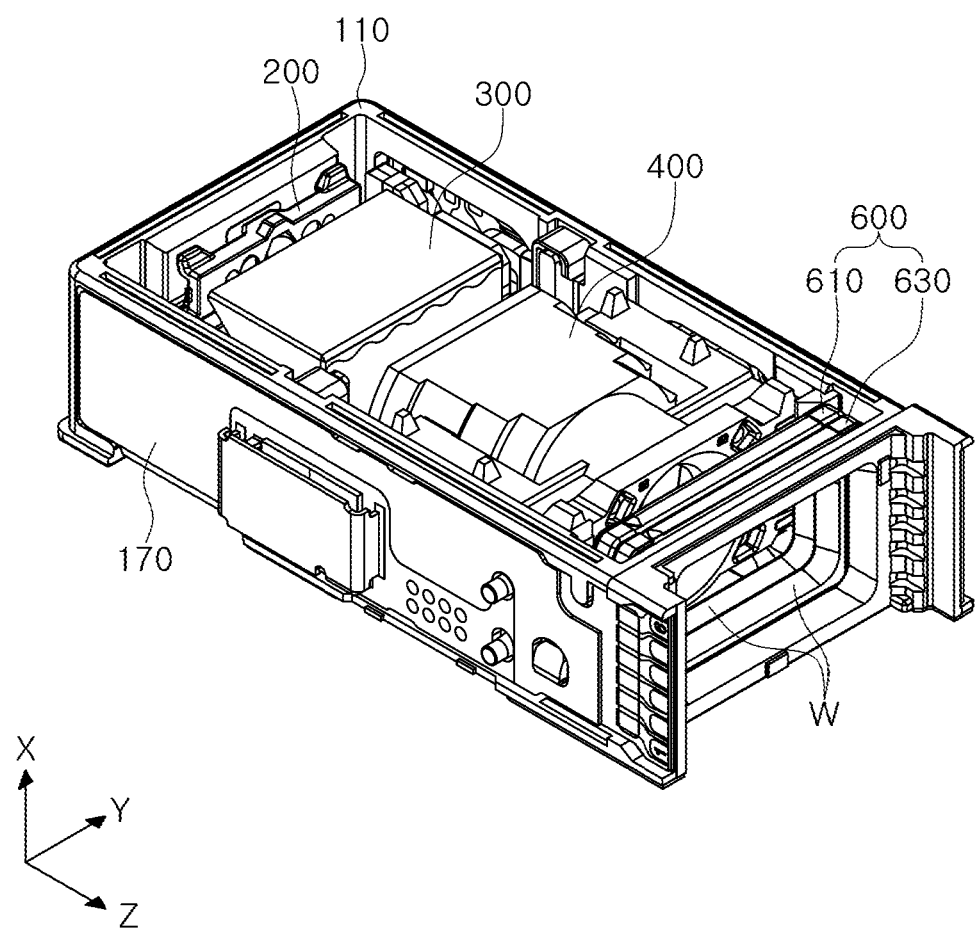
FIG. 14 is a perspective view illustrating a state in which a case is removed from the camera module, according to an embodiment.

FIG. 14 is a perspective view illustrating a state in which the case 130 is removed from the camera module 1000.

The camera module 1000 may include the reflection module 300, the lens module 400, and the image sensor module 500. The reflection module 300, the lens module 400, and the image sensor module 500 may be arranged in the optical axis direction (the Z-axis direction).

Therefore, light of which traveling direction is changed by the reflection module 300 may pass through the lens module 400 to enter an image sensor 510.

When unintended reflection occurs before the light enters the image sensor 510, a flare phenomenon may occur. For example, when light passed through the lens module 400 is irradiated to and reflected from a bottom surface of the housing 110 or an internal surface of the case 130 (a surface opposing the bottom surface of the housing 110) before reaching the image sensor 510, a flare phenomenon may occur. For example, a flare phenomenon may occur due to internal reflection generated in a separation space between the lens module 400 and the image sensor 510.

The camera module 1000 may include a light-shielding portion 600 to prevent a flare phenomenon due to unintended reflection of light. The light-shielding portion 600 may be disposed in a space between the lens module 400 and the image sensor module 500. Therefore, even when unintended reflection of light occurs, scattered and reflected light may be prevented from being incident onto the image sensor 510 by the light-shielding portion 600, to suppress a flare phenomenon.

The light-shielding portion 600 may include at least one light-shielding plate. The light-shielding portion 600 may include, for example, two (2) light-shielding plates.

For example, the light-shielding portion 600 may include a first light-shielding plate 610 and a second light-shielding plate 630. The first light-shielding plate 610 and the second light-shielding plate 630 may be arranged in the optical axis direction (the Z-axis direction).

Each of the first light-shielding plate 610 and the second light-shielding plate 630 may have an opening-shaped window W through which light passed through the lens module 400 enters the image sensor 510.

Light used for image formation may pass through the window W and enter the image sensor 510, and light that may cause a flare phenomenon may be blocked by the first light-shielding plate 610 and the second light-shielding plate 630.

Since it may be difficult to accurately predict light scattered and reflected from the internal space formed by the housing 110, a light-shielding portion composed of only one (1) light-shielding plate may not be sufficient to block unnecessary light.

Since the light-shielding portion 600 includes a plurality of light-shielding plates, a flare phenomenon may be more effectively suppressed, as compared to a configuration including only one (1) light-shielding plate.

Referring to FIG. 3A, an internal wall of the window of the first light-shielding plate 610 and an internal wall of the window of the second light-shielding plate 630 may include an inclined surface, respectively.

For example, an internal wall of the window of the first light-shielding plate 610 and an internal wall of the window of the second light-shielding plate 630 may include inclined surfaces having the same inclination direction.

The internal wall of the window of the first light-shielding plate 610 and the internal wall of the window of the second light-shielding plate 630 may include an inclined surface, respectively, to expand a size (e.g., area) of the window W in the direction of light travel.

For example, in the window W of the first light-shielding plate 610, a size of one side may be smaller than a size of the other side. In addition, in the window W of the second light-shielding plate 630, a size of one side may be smaller than a size of the other side.

In this case, the one side may be a side facing the lens module 400, and the other side may be a side facing the image sensor module 500.

The size of the other side of the window W of the first light-shielding plate 610 may be larger than the size of the one side of the window W of the second light-shielding plate 630.

Even when light is reflected from a surface of the first light-shielding plate 610 and/or a surface of the second light-shielding plate 630 and enters the image sensor 510, a flare phenomenon may be caused.

Therefore, the surface of the first light-shielding plate 610 and the surface of the second light-shielding plate 630 may each include an uneven portion to scatter light.

The surface of the first light-shielding plate 610 and the surface of the second light-shielding plate 630 may be roughly formed by the uneven portions, respectively. For example, the surface of the first light-shielding plate 610 and the surface of the second light-shielding plate 630 may be formed to be rougher than a surface of the housing 110.

As an example, the surface of the first light-shielding plate 610 and the surface of the second light-shielding plate 630 may be respectively corroded to be roughened.

A light-shielding layer may be provided on the surface of the first light-shielding plate 610 and the surface of the second light-shielding plate 630, respectively, to block unnecessary light. For example, the surface of the first light-shielding plate 610 and the surface of the second light-shielding plate 630 may have lower reflectivity, as compared to a surface of the housing 110. The light-shielding layer may have a black color, for example.

According to embodiments disclosed herein, a reflection module and a camera module including the reflection module may accurately sense a position of the reflection module.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module including a plurality of lenses disposed along an optical axis;
a housing accommodating the lens module; and
a reflection module disposed in front of the lens module, and including a reflective member configured to change an optical path, and a holder in which the reflective member is mounted;
a guide member disposed between the housing and the reflection module,
wherein the reflection module is rotatably disposed on a first axis and a second axis perpendicular to the optical axis,
wherein a first position sensor configured to sense a position change of the reflection module with respect to the first axis is disposed in the housing,
wherein a second position sensor configured to sense a position change of the reflection module with respect to the second axis is disposed in the housing,
wherein a sensitivity of the first position sensor is different from a sensitivity of the second position sensor, and
wherein side walls of the holder protrude along the optical axis to cover the guide member.

2. The camera module of claim 1, wherein the first axis is formed in a thickness direction of the housing and the second axis is formed in a width direction of the housing, and
wherein the sensitivity of the second position sensor is higher than the sensitivity of the first position sensor.

3. The camera module of claim 2, wherein the sensitivity of the first position sensor is less than 1.0 mV/mT, and the sensitivity of the second position sensor is 1.0 mV/mT or higher.

4. The camera module of claim 2, wherein the sensitivity of the first position sensor is less than 1.0 mV/mT, and the sensitivity of the second position sensor is 2.0 mV/mT or higher.

5. The camera module of claim 1, wherein the first axis is formed in a thickness direction of the housing and the second axis is formed in a width direction of the housing, and
wherein the first position sensor is a Hall sensor and the second position sensor is a tunnel magnetoresistance (TMR) sensor.

6. The camera module of claim 1, further comprising:
a first driving portion configured to rotate the reflection module about the first axis; and
a second driving portion configured to rotate the reflection module about the second axis,
wherein the first driving portion includes a first magnet disposed on the reflection module and a first coil opposing the first magnet, and
wherein the second driving portion includes a second magnet disposed on the reflection module and a second coil opposing the second magnet.

7. The camera module of claim 6, wherein the first magnet has a shape having a length in a direction of the first axis, and
wherein a surface of the first magnet opposing the first coil has a first polarity, a neutral region, and a second polarity along the optical axis.

8. The camera module of claim 7, wherein the first position sensor is disposed to oppose the neutral region of the first magnet.

9. The camera module of claim 6, wherein the second magnet has a shape having a length in a direction of the optical axis, and
wherein a surface of the second magnet opposing the second coil has a first polarity, a neutral region, and a second polarity along the first axis.

10. The camera module of claim 9, wherein the second position sensor is disposed to oppose the neutral region of the second magnet.

11. The camera module of claim 6, wherein the first magnet and the second magnet are disposed on a side wall of the holder, and
wherein the second magnet is disposed closer to the lens module, as compared to the first magnet.

12. The camera module of claim 6, wherein the first driving portion is configured to generate driving force in a direction of the optical axis, and
wherein the second driving portion is configured to generate driving force in a direction of the first axis.

13. The camera module of claim 1, further comprising:
a first ball member disposed between the reflection module and the guide member and including a plurality of ball members disposed along the first axis; and
a second ball member disposed between the housing and the guide member and including a plurality of ball members disposed along the second axis.

14. A reflection module comprising:
a reflective member configured to change an optical path;
a holder in which the reflective member is mounted;
a housing accommodating the holder;
a first driving portion including a first magnet disposed on the holder and a first coil opposing the first magnet; and
a second driving portion including a second magnet disposed on the holder and a second coil opposing the second magnet,
wherein the holder is rotatable around a first axis by the first driving portion, and is rotatable around a second axis perpendicular to the first axis by the second driving portion,
wherein a first position sensor opposing the first magnet and a second position sensor opposing the second magnet are disposed in the housing, and
wherein a sensitivity of the first position sensor is different from a sensitivity of the second position sensor.

15. The reflection module of claim 14, wherein the holder is configured to pivot around the first axis, in between left and right directions, and is configured to pivot around the second axis, in between upward and downward directions, and
wherein the sensitivity of the second position sensor is higher than the sensitivity of the first position sensor.

16. The reflection module of claim 15, wherein the first position sensor is a Hall sensor, and the second position sensor is a tunnel magnetoresistance (TMR) sensor.

17. An electronic device, comprising:
a camera module mounted in the electronic device, and comprising:
a lens module including a plurality of lenses disposed along an optical axis;
a housing accommodating the lens module;
a reflection module configured to change an optical path, being rotatably disposed on a first axis and a second axis perpendicular to the optical axis, and comprising a holder and a reflective member disposed in the holder;
a guide member disposed between the housing and the reflection module;
a first position sensor disposed in the housing and configured to sense a position change of the reflection module with respect to the first axis; and
a second position sensor disposed in the housing and configured to sense a position change of the reflection module with respect to the second axis,
wherein a sensitivity of the first position sensor is different from a sensitivity of the second position sensor, and
wherein side walls of the holder protrude along the optical axis to cover the guide member.

18. The electronic device of claim 17, wherein the light is incident to the reflection module in a direction of the first axis, and the direction of the first axis corresponds to a thickness direction of the housing.

19. The electronic device of claim 18, wherein a direction of the second axis corresponds to a width direction of the housing, and
wherein the sensitivity of the second position sensor is higher than the sensitivity of the first position sensor.

20. The electronic device of claim 17, wherein a type of the first position sensor is different than a type of the second position sensor.

* * * * *